Dec. 3, 1968 P. PROUST 3,414,197
WIRE-PULLING ASSEMBLY PERMITTING THE SELECTIVE FORMATION
OF A WELDING GUN OR A METALLISATION GUN
Filed March 13, 1967 4 Sheets-Sheet 1
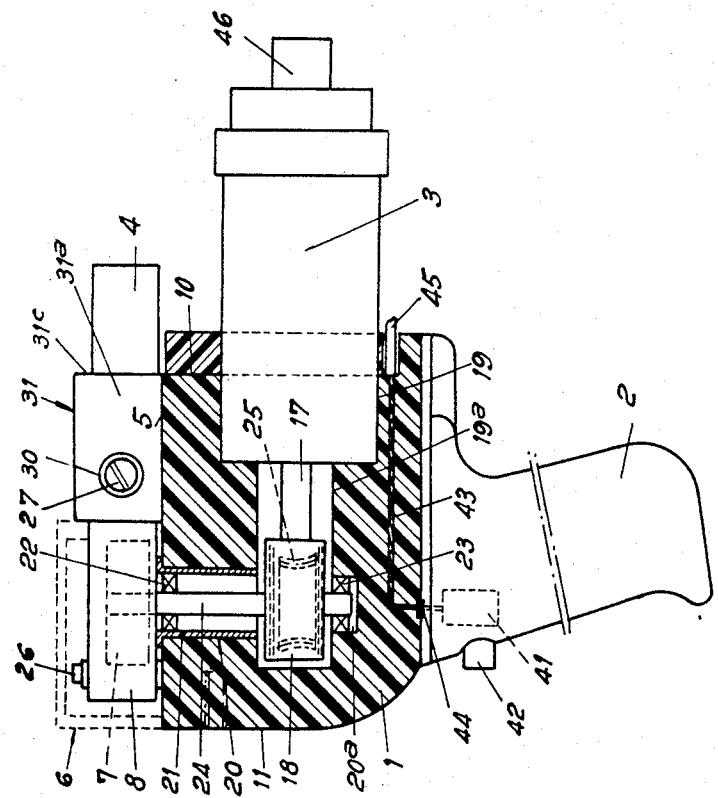
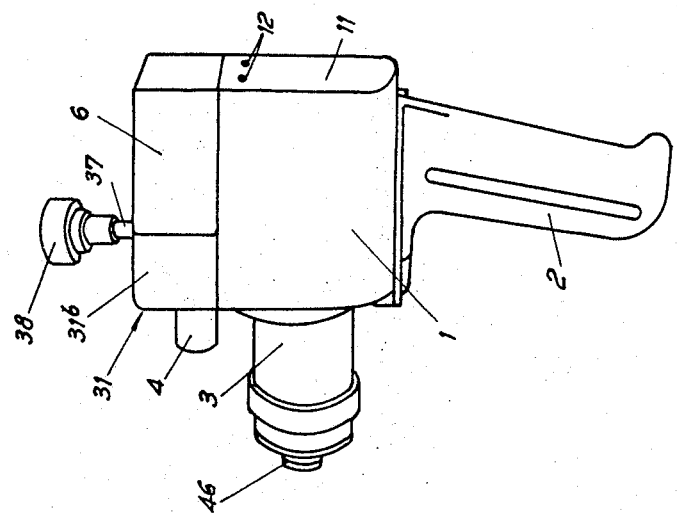
Inventor
Pierre Proust.
by Christy, Parmelee & Strickland
attorney.

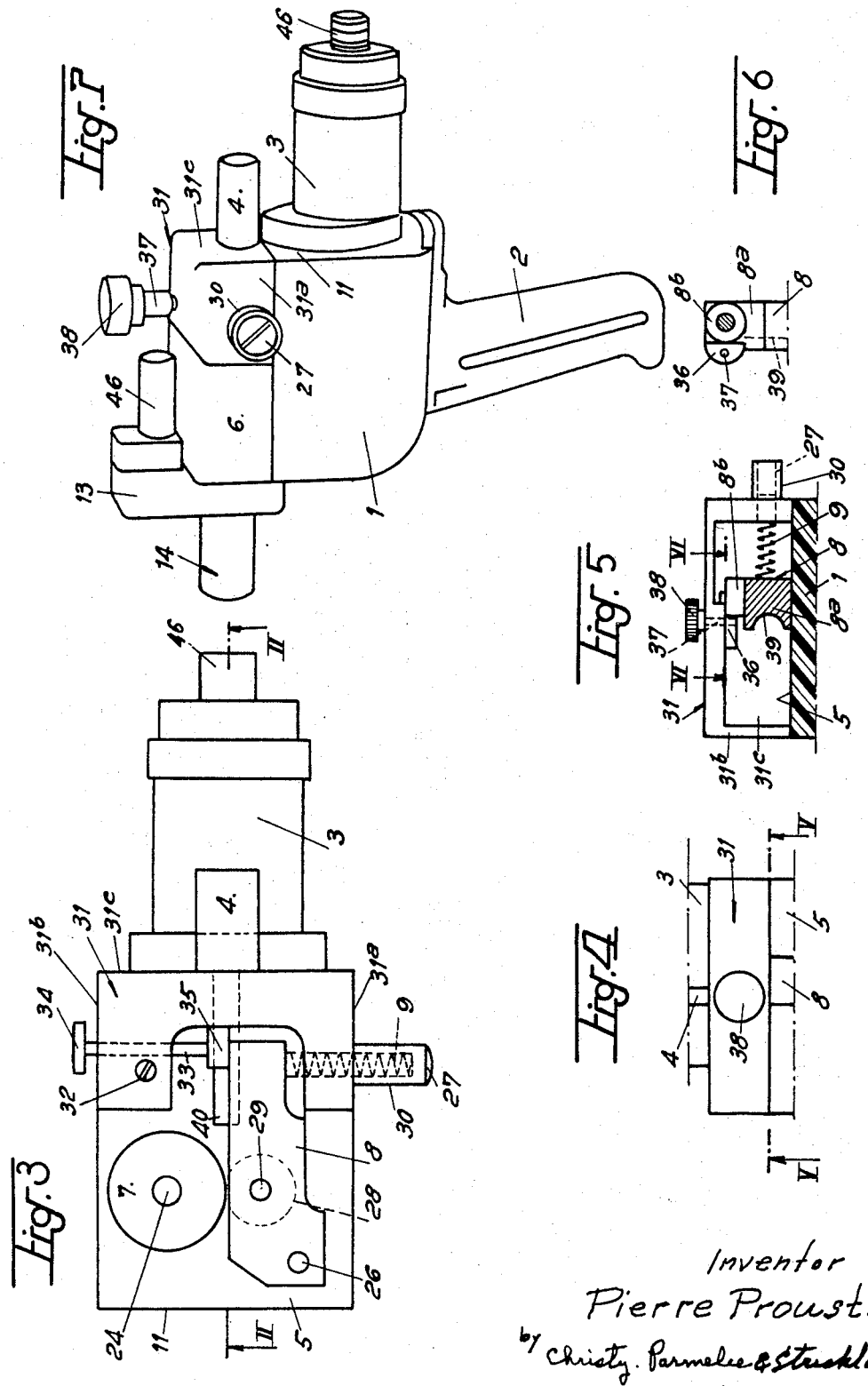

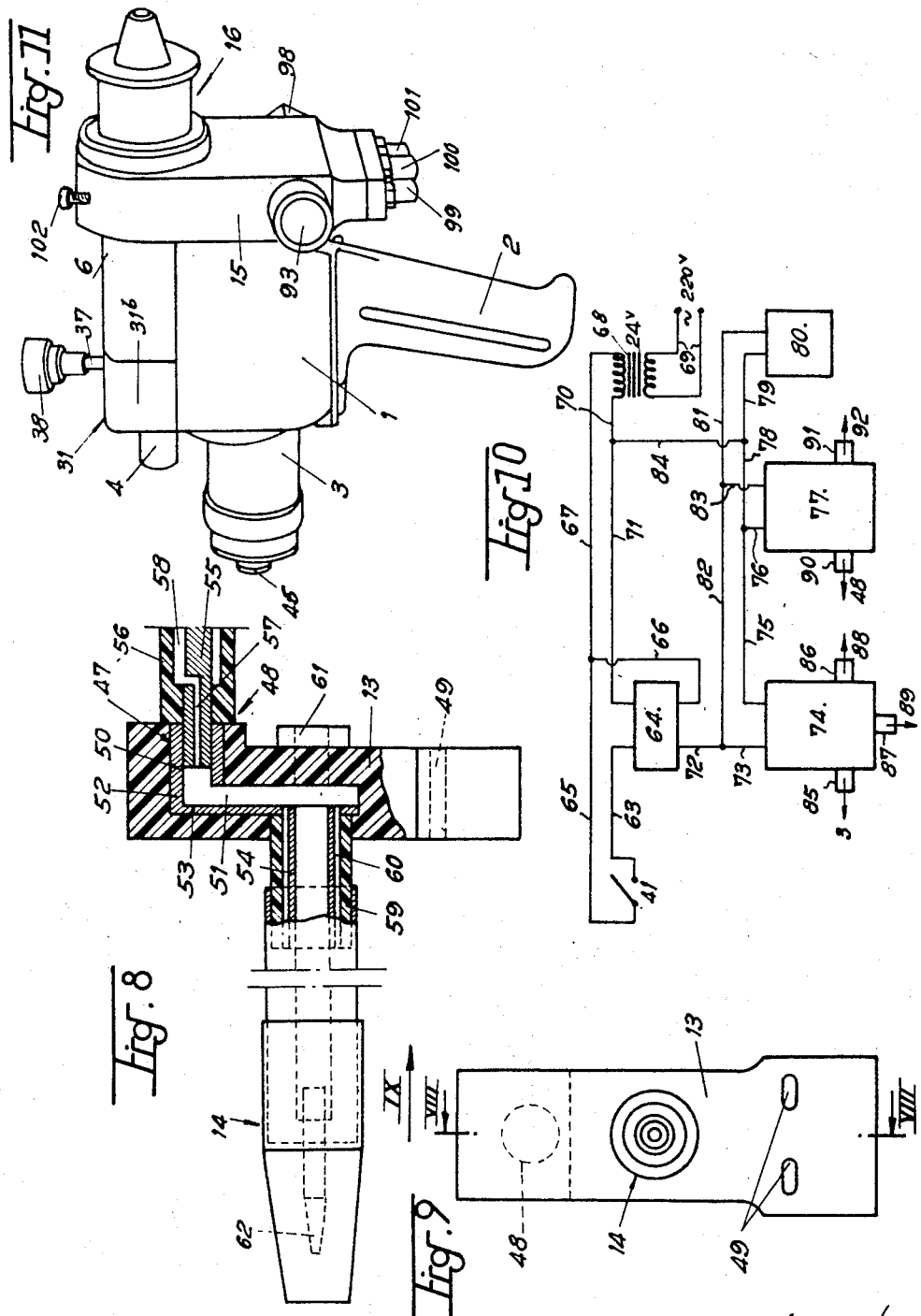

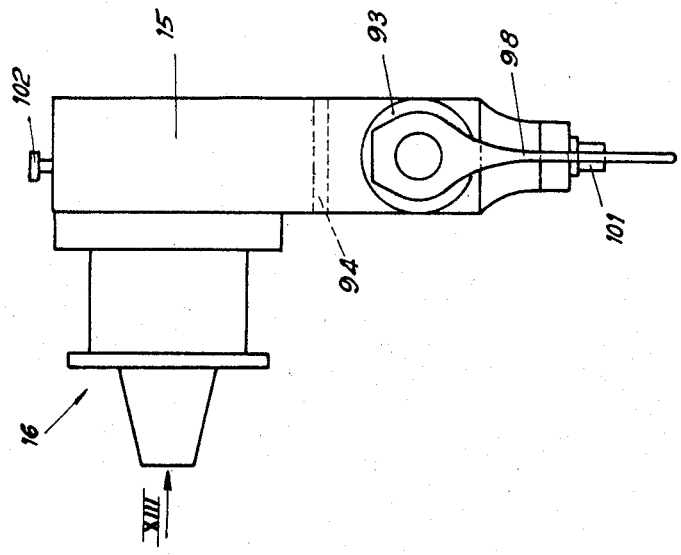
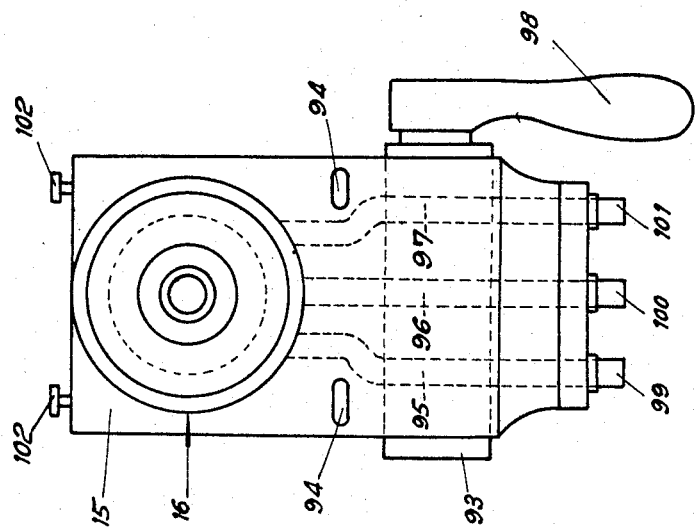

United States Patent Office 3,414,197
Patented Dec. 3, 1968

3,414,197
WIRE-PULLING ASSEMBLY PERMITTING THE SELECTIVE FORMATION OF A WELDING GUN OR A METALLISATION GUN
Pierre Proust, 7 Rue de Chantilly, Paris, 9eme, France
Filed Mar. 13, 1967, Ser. No. 622,661
Claims priority, application France, Mar. 15, 1966, 53,421
15 Claims. (Cl. 239—289)

ABSTRACT OF THE DISCLOSURE

Wire pulling assembly permitting the selective formation of a welding gun or a metallisation gun, comprising an insulating casing of a low density material provided with a removable handle, the casing supporting a drive roller and a motor for driving said roller, the wire being driven by friction out of its passage between the driving roller and a retractable pawl which can be fixed in a controllable manner, a detachable support which carries a head corresponding to the type of gun which it is desired to produce, the support being provided with at least one duct for the passage of a gas, and the assembly being provided with easily connectable means on the casing or the support for connecting the detachable various customary electrical, hydraulic or pneumatic circuits necessary for the operation of a welding gun or a metallisation gun.

In the following description the expression "welding gun" will be used to designate an electric arc welding gun with continuous welding wire feed, and the expression "metallisation gun" to designate a Schoop process metallization gun with continuous metallisation wire feed.

BACKGROUND OF THE INVENTION

The numerous guns in existence for welding or metallisation with continuous feeding of the welding or metallisation wire may be classified in three categories:

(1) Guns in which the wire is pushed from a wire reel, which are the most numerous, are actually only welding toches, since they have no motor mechanism in the gun itself; their advantage is simplicity and their generally reasonable weight, but it is difficult for them to push the welding wire at a distance of more than 4 metres from the reel in the case of a ferrous alloy wire of a diameter equal to or greater than 10/10 mm., and can scarcely push it to a distance of more than two metres when the diameter is between 6/10 mm. and 10/10 mm.; with regard to non-ferrous alloy wires, which have less rigidity, these are not generally pushed if they have a diameter of less than 10/10 mm. or, if they are, they are pushed only to a short distance from the reel.

(2) Guns in which the wire is simultaneously pushed and pulled, of which there are few types, have the disadvantage that it is practically impossible to synchronise perfectly the speed of the pushing motor and that of the pulling motor, so that the quality and homogeneity of the weld suffer; in addition, the range of wire advance speeds is relatively restricted.

(3) Guns in which the wire is pulled are also not in widespread use, because the existing models have the principal defect of their high weight (2–3 kg.) which makes them inconvenient to handle and often badly balanced; this results in increased fatigue of the welder, which rapidly impairs the quality of the welding.

Known semi-automatic welding guns all belong to the three categories referred to above, while metallisation guns are found only in the third category.

SUMMARY OF THE INVENTION

According to the invention, there is provided a wire puller assembly permitting the selective formation of a welding gun or a metallisation gun, characterised in that it comprises in combination a main casing of a material of low density which does not conduct electricity; a removable handle adapted to be fitted to said casing; a motor accommodated in said casing; a wire drive device comprising a detachable, interchangeable drive roller and a pawl having a spring and mounted on the casing to be adjustable in relation to the drive roller; a mechanical connection between the motor and the drive roller; disconnectible means for supplying the welding or metallisation wire through the wire puller assembly; disconnectable means for supplying the necessary power to the motor; a base pierced by at least one channel for the supply of a gas to a head of a type known per se and carried by the base, corresponding to the type of gun which it is desired to form; disconnectable means for connecting said passage to an external source; and means for detachably and adjustably fastening said base on said casing.

The invention also provides a mechanism carrier assembly which can at will be fitted to a welding gun or a metallisation gun for the purpose of driving the wire which comprises in combination a main casing having a plane upper face and two plane end faces and made of a material of low density which is not a conductor of electricity, a handle adapted to be fitted by screws to one face of said casing opposite to the aforesaid top plane face, a first blind bore disposed in the longitudinal direction of the casing and leading into one of the aforesaid plane end faces, a second blind bore the axis of which is situated in a plane perpendicular to the axis of the first bore and leading into the aforesaid top plane face of the casing and intersecting a side wall of the first bore near the closed end of the latter, a motor-reduction gear unit adapted to be fitted in the open end of the first bore with its shaft coaxial to the latter, a worm carried by the free end of said shaft and extending in said bore, a helicoidal gear engaging laterally with said worm, a countershaft disposed coaxially inside the second bore, extending along the entire length of the latter, and having the aforesaid helicoidal gear keyed on one of its ends, bearings for said shaft which are mounted in the second bore, a wire driving roller mounted detachably on the second end of the countershaft, a spring pawl pivoted at one end on the top plane face of the casing near the drive roller, a roller mounted loosely in said pawl and having its axis parallel to that of the drive roller in a plane extending transversely of the assembly and which is adapted to cooperate with the drive roller for the purpose of gripping and driving the wire, a disengaging device for moving the pawl away from the wire, a support member fixed detachably on the top plane face of the casing, a wire guide carried by said member, a disconnectable connection for supplying the necessary power to the motor, a head carrier base pierced with channels for the supply of the gas and/or electric current, to a head of a type known per se and intended, as the case may be, for welding or metallisation and carried by said base, disconnectable means for connecting said channels to external sources, and means for detachably and adjustably fastening said base on the second plane end face of the casing.

The pivot of the pawl is preferably mounted on an eccentric, which in turn is pivoted on the top plane face of the casing, or else on a slide which in turn is adapted to slide transversely in suitable slide guides on the aforesaid plane face.

The mechanism carrier assembly for welding or metallisation guns which forms the object of the invention overcomes the aforesaid defects of existing guns; in addition, its particular form of construction enables it to be fitted at will to a welding gun or to a metallisation gun, by simply replacing within a few moments the welding head by a metallisation head, or vice versa, which rationalises the manufacture of the two types of guns, reduces their cost price, and makes their use less expensive to the user; it is the only mechanism in existence at the present time which can be used both for welding and for metallisation, both of which it does perfectly.

The main advantages of welding or metallisation guns incorporating the mechanism which forms the object of the invention are the following:

(1) Their low weight: about 1,300 grams for the complete pistol equipped with an uncooled welding head, about 1600 grams for the same pistol equipped with a welding head cooled by air or water circulation, and finally about 700 grams for the same pistol equipped with a metallisation head.

(2) Their great ease of handling, due to their excellent balancing and to the functional selection of the points of attachment of their feed means.

(3) Their strength, due to the utilisation in their manufacture, of amply dimensioned, tried and tested materials and of conventional mechanical and electrical solutions.

(4) Their complete safety in use in respect of the danger of electrocution for a welding gun, because of the exclusive use of insulating plastics material for all outer faces, and in respect of the risk of explosion or being set on fire in the case of a metallisation gun, because of the special precautions taken against the escape of gas in the construction of the metallisation head.

(5) The very great variation of wire speed, due to at least two possible adjustments. In the case of an electric or hydraulic motor, adjustment may be effected by varying the speed of the motor; in the case of a pneumatic motor, progressive adjustment is possible by simple variation of the pressure of the compressed air feeding the motor (by changing the adjustment of the air pressure reduction valve on the control panel); final adjustment is then possible by operating the needle valve situated on the gun itself and controlling the flow of air admitted to the pneumatic motor; finally, in all cases, adjustment by stages, giving a variation from single to triple is possible by simply replacing, in a matter of minutes, the drive roller driving the wheel by another roller of a larger or smaller diameter.

(6) The immediate interchangeability of the complete welding head with another of a different model or with a metallisation head, because these heads are simply fixed by two screws on the vertical front face of the main casing of the gun.

(7) The possibility of immediate replacement of parts liable to wear without special tools, namely in the case of the welding gun the electric contact nozzle for the wire and the nozzle for the concentration of the protective gaseous fluid, and in the case of the metallisation gun the wire melting nozzle and the air sleeve of the spray torch.

(8) Mechanical simplicity, because the assembly is composed of independent members (which can be replaced in a few moments in the event of damage) which are common to the welding model and to the metallisation model.

The particular advantages of a welding gun constructed in accordance with the invention are as follows:

(1) Its autonomy of movement (in the course of working) is unequalled, because it is the only one capable of effecting welding at a distance of five metres from the reel with all welding wires, whatever their diameter or material, and up to 8 or even 10 metres with wires of small diameter (6/10 to 10/10 mm.) of ferrous alloys.

(2) The ability to connect and disconnect it instantaneously, which enables it to be completely freed of its supply means (electric cables, wire supply duct, compressed air piping) without tools, thus facilitating its transport, maintenance, and packing away in a case.

(3) The exceptional, constant quality of the welding effected, which is due to the great regularity of advance of the welding wire (easily pulled because it is possible to use a pneumatic motor which is extremely powerful despite its low weight) and to the excellent annular distribution of the protective gaseous fluid, as well as to the reduced fatigue of the operator because of the lightness and ease of handling of the welding gun.

A gun equipped in accordance with the invention with a metallisation head has a higher output than known devices (that is to say it permits the spraying of a greater weight of metal in the same time and with the same consumption of fuel and combustion gas) because of the possibility of using metallisation wires the diameter of which may range from 1 to 5 mm., without any other change being required than the replacement of the melting nozzle and the air spray sleeve.

In one embodiment of the invention the pawl disconnection device is constituted by a screw disposed transversely of the casing and screwing into the aforesaid support member, its end bearing on the pawl at a suitable point.

In an alternative, this disconnection device is constituted by a cam situated in a plane parallel or perpendicular to the top plane face of the casing and mounted on an axis perpendicular or parallel to said face and having at its free end an operating means such as a knurled knob or a handle.

It is advantageous for electric conductors to be buried in the mass of the casing and to terminate at one end in means for connecting them to a circuit outside the casing and at the other end in means for connecting them to a control switch embedded in the handle of the casing and provided with an operating button accessible from the outside of said handle.

If the mechanism carrier assembly is applied to a welding gun, it is advantageous for the aforesaid external electric circuit to contain a three-way electrically operated valve connected to a compressed air source, to the motor of the mechanism carrier assembly, and to the free atmosphere, the obturator device of the same being provided with means for connecting the compressed air source to the motor only if the switch in the handle is closed.

The means for detachably fastening the head-carrier base on the casing of the mechanism carrier assembly preferably comprise elongated slots in the base, tapped holes in one plane end face of the casing and screws passing through said slots and said holes.

Finally, the pawl spring is advantageously accommodated in a socket integral with the aforesaid support member and provided with an internal screw thread for a screw adjusting the pressure of the spring, said screw being accessible from the outside of the socket.

The invention will be better understood on reading the following detailed description, given with reference to the accompanying diagrammatic drawings, which are given only by way of example and without limitation.

DESCRIPTION OF THE DRAWINGS

FIGURE 1 is an isometric projection showing the right-hand side of a mechanism carrier assembly according to the invention.

FIGURE 2 is an elevation in partial section on the line II—II in FIGURE 3, and FIGURE 3 is a top plan view of the assembly illustrated in FIGURE 1.

FIGURE 4 is a plan of an alternative form of the pawl disconnection device.

FIGURE 5 is a section on the line V—V in FIGURE 4.

FIGURE 6 is a section of a detail on the line VI—VI in FIGURE 5.

FIGURE 7 is a perspective view of the assembly shown in FIGURE 1, incorporated in a welding gun, but viewed from the left-hand side.

FIGURE 8 is an elevation with partial section on the line VIII—VIII of a welding head adapted to fit the mechanism carrier assembly according to the invention.

FIGURE 9 is an elevation in the direction of the arrow IV in FIGURE 8.

FIGURE 10 is a diagram of the electrical connections associated with the mechanism carrier assembly according to the invention in the case where the latter is fitted to a welding gun.

FIGURE 11 is a perspective view of the assembly illustrated in FIGURE 1, incorporated in a metallisation gun.

FIGURE 12 is an elevation, corresponding to FIGURE 8, of a metallisation head adapted to be fitted to the mechanism carrier assembly according to the invention.

FIGURE 13 is an elevation in the direction of the arrow XIII in FIGURE 12.

DETAILED DESCRIPTION OF THE INVENTION

In FIGURES 1 to 3 it can be seen that the mechanism carrier assembly according to the invention comprises a main casing 1 of synthetic plastics material of low density and having good mechanical strength and electric insulation properties, on which there are fixed a handle 2, a motor-reduction gear unit 3, and a socket 4 forming part of a system for guiding the wire from the usual reel, not illustrated. The casing 1 has a plane top face 5 on which there are mounted, under a protective cover 6, a drive roller 7 for driving the wire, a pawl 8 cooperating with the roller, a spring 9 for said pawl, and a wire disconnection device which will be described in detail later on. The casing 1 has two other plane end faces, which are parallel to one another and perpendicular to the face 5 and are situated respectively at the rear (face 10) and at the front (face 11). The motor 3 is mounted in the face 10 in a manner which will be described hereinbelow, while on the face 11 there are provided two tapped holes 12 for receiving screws intended for the fixing of a removable base 13 which carries a welding head 14 (FIGURES 7 to 9) or a base 15 which carries a metallisation head 16 (FIGURES 11 to 13).

The means of mechanical connection between the motor 3 and the drive roller 7 are situated inside the casing 1 (FIGURE 2). In the example illustrated the motor 3 is, for reasons of low weight, lower price, simplicity, and strength, a conventional pneumatic motor comprising a rotor provided with blades turning under the action of compressed air in an eccentric stator. This motor, the construction of which must be very accurate in order to have good efficiency, develops a power between 1/10 and 1/2 HP. It contains a planetary reduction gearing (not visible) which at the end of its shaft 17 drives a worm 18. The aforesaid pneumatic motor could, however, naturally be replaced by an electric or hydraulic motor.

The motor 3. the shaft 17, and the worm 18 are accommodated in a blind bore 19, 19a provided longitudinally in the casing 1 and leading into the face 10. A blind bore 20, 20a leading into the top face 5 of the casing intersects perpendicularly the bore 19a on one side of the latter, at a short distance from its closed end. In the top portion 20 of said bore there is situated a socket 21 of light metal inside which, with the aid of a ball bearing 22 mounted in the socket and a ball bearing 23 mounted in the bottom 20a of the bore, a steel shaft 24 rotates which at its bottom part carries a helicoidal gear 25 engaging laterally with the worm 18 driven by the motor 3 at a suitable speed. The vertical countershaft 24 is solid at its top part to the drive roller 7, which is mounted detachably. Depending on the diameter selected for said drive roller, which may for example vary between 10 and 30 mm., a range of wire advance speeds is obtained which is variable in the same proportion, that is to say from 1 to 3, which, multiplied by the variation of speeds of the pneumatic motor itself (which is from 1 to 4 or from 1 to 5) gives a total possible variation of speeds for the adjustment of the advance of the wire of the order of from 1 to 12 or from 1 to 15.

The drive roller 7 is of treated steel. In order to grip the wire more effectively its rim is knurled or milled at a suitable pitch and may either be cylindrical (principally for wires of small diameter) or be provided with a V-shaped groove of suitable depth and angle. A conventional device such as a key, pin, a screw thread, or the like, not illustrated, secures the drive roller detachably to the countershaft 24.

The pawl (FIGURE 3) is of metal or synthetic plastics material. It pivots about a vertical axis 26, describing a portion of an arc of a circle in the direction of the drive roller 7 as the result of the thrust of the spring 9, the pressure of which is adjustable by means of a screw 27 accessible from outside the casing. A loose roller 28 is pivoted at 29 in the thickness of the pawl. Its rim of treated steel is smooth and under the action of the spring 9 applies a constant pressure to the wire (not illustrated) in the direction of the rim of the drive roller 7. The latter, rotating in the correct direction under the action of the motor 3, pulls the wire from a conventional reel (not illustrated) and obliges it to advance towards the welding head 14 or metallisation head 16 fixed to the face 11 of the casing 1.

The spring 9 is situated in a guide socket 30, which in turn is mounted in a vertical wall 31a of a support member 31 fixed by screws, such as 32, to the face 5 of the casing 1, its walls 31a to 31c forming respective extensions in the upward direction of the side walls and of the wall 11 of the casing 1.

In order to be able to adjust the main distance between centres of the roller 28 to the diameter of the drive roller 7 used, the pivots 26 of the pawl is preferably mounted on an eccentric or is solid to a slide, not illustrated. The eccentric is in turn pivoted on the face 5 of the casing or the slide is movable in transversal slide guides on said face.

The pawl 8 can be disconnected by means of a suitable device. In FIGURE 3, this device is constituted by a screw 33 of treated steel and provided with a knurled head 34, which is screwed into a tapped socket (not illustrated) fixed in the vertical wall 31b of the member 31 opposite the wall 31a which supports the socket 30; as illustrated, the screw 33 may also be screwed directly into the wall 31b and also into a part 35 carried by the wall 31c. In both cases the free end of the screw 33 bears against a suitable part of the pawl 8. In an alternative which is not illustrated, the screw 33 is replaced by an axis which pivots in a socket solid to the wall 31b and at its end carries a cam which cooperates with a suitable surface of the pawl 8. In the construction illustrated in FIGURES 1, 4 to 7, and 11, the disconnection device comprised a cam 36 pivoted to a vertical axis 37 ending in a knurled head 38 or a handle and passing through the top wall of the part 31. In this case the pawl advantageously has a part 8a of reduced height, from which a cylindrical nipple projects, with which the cam 36 cooperates. In FIGURE 5 can be seen a lateral recess in the pawl which is intended to allow the wire to pass.

As indicated, the socket 4 is an element of the wire guide device in the mechanism carrier assembly according to the invention. When this assembly is fitted to a welding gun, the socket 4 serves to fasten to the casing 1, in the correct position, one end of the flexible, electrically insulated sheath in which the welding wire runs from the reel to the gun. The socket 4 is preferably rigidly connected to a fastening plate (not illustrated) which, by sliding laterally in a slide guide provided in the vertical walls 31c of the part 31, permits its correct axial positioning in dependence on the diameter of the drive roller fitted at any patricular time. In the case of a metallisation gun, the aforesaid sheath is not necessary because the wire, having no voltage applied to it, circulates in the open air. In all cases a rear wire guide 40 (FIGURE 3)

is solid with the socket 4, of which it is an extension. It forces the wire to come into contact with the drive roller 7 and the roller 28 at the desired point.

The handle 2 enables the gun to be held by the operator. In its interior it advanageously contains an electric switch 41 provided with an external push-button 42 which can easily be operated by the index finger of the operator after the style of a trigger. The switch 41 controls in known manner a low tension pilot circuit (advantageously 24 volts) the active element of which is a holding relay which is fixed for example on the casing of the reel and which operates the various electric valves and the remote control switch supplying current to the gun, all this being achieved in a manner which will be briefly described hereinbelow with reference to FIGURE 10.

The handle 2 is advantageously fixed detachably to the casing 1, for example by four screws which cooperate with tapped holes provided for the purpose in the casing 1. If the handle 2 is to conatin a switch 41, the casing 1, which is advantageously of mouldable material, is provided during the moulding operation with two conductors 43 which lead on the one hand to two contacts 44 with which, when the handle is assembled, two corresponding contacts connected to the switch 41 come into contact, and on the other hand to two sockets 45 intended to receive disconnectable plugs permitting connection to the casing 1 of the electric wires of the aforesaid remote control pilot circuit.

In addition, a disconnectable connection socket 46 effects the instantaneous connection to the motor 3 of the electric cable or pipe supplying fluid to said motor.

Finally, the protective cover 6 is advantageously of opaque or transparent synthetic plastics material; it protects the wire drive mechanism and, in the case of a welding gun, eliminates the risk that the operator may touch parts such as the welding wire to which voltage is applied.

As previously indicated, the mechanism carrier assembly forming the subject of the present invention may be equipped with two different types of welding head and one type of metallisation head. A welding head not provided with a cooling device is intended for low and medium current welding work (maximum about 200 amperes). A welding head cooled by circulation of air or water is suitable for high or very high current welding work (from 200 to 700 amperes).

Welding heads of the two types referred to do not in themselves form part of the invention. Of one of them, the non-cooled type, a description will be given of only the essential characteristics which both must possess in order to fit the mechanism carrier assembly which constitutes the object of the invention. This description will be given with reference to FIGURES 7 to 9.

As these figures show, the welding heads 14 are mounted on a base designated generally by 13. At its top part this base has a socket designated generally by 47 and intended to receive a disconnectable single-pole electric connector 48 of suitable section which permits the instantaneous connection and disconnection of the welding current supply cable, not illustrated, at the end of which the connector is mounted. The protective sheath of this cable usually serves as a conduit for the protective gas, for example argon, $CO_2$, etc., from the reel to the casing of the welding head, for the purpose of feeding a protective gas nozzle of known type.

The base 13 of the cooled or uncooled welding head 14 is of insulating plastics material; it serves as support for various parts and provides them with electrical insulation; as already indicated, it is fixed by two screws (not illustrated) which can be accommodated in the holes 12 in the face 11 in the main casing 1 with the aid of two elongated holes or slots 49 of suitable width (FIGURE 9) which enables the base 13 and therefore the welding head 14 to assume by sliding sideways a correct axial position depending on the diameter of the drive roller 7 used.

The socket 47 is received in a blind bore 50 in the base 13 which communicates with a perpendicular bore 51. The socket 47 contains a conductive sleeve 52 in contact with a conductor bar 53 which connects the sleeve 52 to a conductor tube 54 forming part of the actual head 14. The connector 48 contains a hollow conductor 55 embedded in an insulating sheath 56 and engaging in the sleeve 52. The conductor 55 constitutes the end of the electric cable supplying the welding current to the head 14. It is pierced axially by a passage 57 connected to a passage 58 provided in the sheath 56 around the conductor 55, and, as previously indicated, supplying the protective gas. The tube 54 is surrounded by an insulating sleeve 59 which provides between it and the tube an annular passage 60 for the protective gas. The latter, in known manner, therefore arrives through the channels 58, 57, 51 and 60 around the wires (not illustrated), which itself arrives through a front wire guide 61 made fast to the base 13 concentrically to the tube 54 and therefore to the head 14 as a whole, in a well known manner. Similarly, the current arrives through the cable 55, the socket 47, the bar 53, and the tube 54 to the contact nozzle 62 (FIGURE 8). The head 14 may be of any construction, and, since it does not form part of the invention, need not be described in detail.

The operation of the apparatus as a welding gun can be clearly understood from the foregoing description. It will briefly be indicated, with reference to FIGURE 10, how the electric control circuits of the gun illustrated in FIGURES 7 to 9 are preferably arranged. The switch 41 in the handle 2 is connected by a wire 63 to a terminal of a low tension 24 volts relay 64 and by a wire 65, 66 to another terminal of said relay. A wire 67 connects the junction of the wires 65, 66 to the secondary of a transformer 68, the primary of which is connected at 69 to the 220 volt alternating current supply. A wire 70, 71 connects the secondary of the transformer 68 to a third terminal of the relay 64. A fourth terminal of this relay is connected by a wire 72, 73 to a terminal of a three-way electrically controlled valve 74. A wire 75, 76 connects the third terminal of this valve to a second electrically controlled valve 77. A wire 78, 79 connects the junction of the wires 75, 76 to a terminal of a welding current control relay 80. The second terminal of this relay is connected by a wire 81, 82 to the junction of the wires 72, 73. A wire 83 connects the junction of the wires 81, 82 to the second terminal of the valve 77. Finally, a wire 84 connects the junction of the wires 78, 79 to that of the wires 70, 71. The valve 74 has three connections 85 to 87 connected respectively to the piston 3, to a compressed air supply 88, and to the atmosphere 89. The valve 77 has two connections 90, 91 connected respectively to the connector 48 and to an inert protective gas supply 22. It will be noted that part of the conductors 63 and 65 in FIGURE 10 corresponds in practice to the conductors 43 in FIGURE 2.

By acting on the push-button 42 of the switch 41 the user of the gun supplies the welding current in known manner to the wire forming the fusible electrode, and the electrically controlled valve 77 connects an inert gas source 92 to the passage 60 in the welding head 14. With regard to the electrically controlled valve 74, this is so designed that the passage of the current brings the connections 85 and 86 into communication, that is to say connects the compressed air source 88 to the sleeve 3. On the other hand, when the current is interrupted, that is to say when the switch 41 is open, communication is immediately established between the connections 85 and 87, that is to say between the motor 3 and the atmosphere 89. In this manner the advance of the wire is immediately stopped, contrarily to what occurs in known gun welding installations.

Referring now to FIGURES 11 to 13, it is seen that the base 15 of the metallisation head 16 is either of metal or of self-extinguishing synthetic plastics material and supports the two main members of the metallisation head, namely a valve designated generally by 93 and controlling the spray fluid (compressed gas) and the fluid serving for the melting of the wire (fuel and combustion agent), and the actual torch 16 which serves for melting and spraying. The base is fixed by two screws which are received in the tapped holes 12 in the face 11 of the main casing 1 instead of the base 13 of the welding head 14 described above. In order to permit the adjustment of the head 16 in accordance with the diameter of the drive roller 7, elongated holes or slots 94 corresponding to the holes or slots 49 in FIGURES 8 and 9 are provided.

The valve 93 controls simultaneously three passages 95 to 97 and permits the stoppage, ignition, and operation with full gas supply of the torch of the metallisation gun. A handle 98 secured to the rotating member of the valve 93 permits the control of the latter by rotation by a quarter revolution. Three connections 99 to 101 for the gases are screwed to the bottom part of the base 15 and are in direct communication with the three passages 95 to 97. The passage 96 preferably supplies the compressed air intended for the atomisation of the metal melted by the combustion of the fuel (for example acetylene) supplied through the passage 95 in the combustion agent (for example oxygen) supplied through the passage 97. The fuel and combustion agent are mixed in known manner inside the base 15 or head 16. The head 16 proper is likewise of known type and need not be described. Two adjusting valves 102 secured to the base 15 preferably enable the operator to adjust the fuel and combustion gases, which effect the melting of the metallisation wire, in the course of operation is required. The switch 41 in the handle 2 is in this case connected to a suitable electric circuit which delivers the compressed air to the motor 3 so as to advance the wire. By acting on the handle 98 the user opens the passage for the gas and has then only to light the torch in the usual manner.

From the foregoing description it is clear that the operation of the mechanism carrier assembly is very simple. By means of two screws the user fits the base 13 or 15 to the face 11 of the casing 1. If necessary, he changes the drive wheel 7 in dependence on the speed of advance desired for the wire. All that is then required is to introduce the wire into the wire guide 4, to connect the socket 46 to the compressed air pipe, the plug 45 to the external electric circuit, and when the head used is a metallisation head to connect the three supply passages for the three gases to the connections 99 to 101. Since simple devices, particularly plug type sockets, have been used, the connection of the different gas supply or current circuits to the gun assembly is extremely easy.

If the electric motor 3 is an electric motor, the socket 46 is of course connected to the external electric circuit. In the case of a hydraulic motor, the connection 46 is connected to a suitably supply of liquid under pressure.

Any modifications which may be required by the use of a non-pneumatic motor need not be made to the mechanism carrier assembly but only to the external electric control circuit, in a manner which does not form an object of the invention but which is obvious to all technicians, and which it is therefore unnecessary to describe in detail.

I claim:

1. A wire puller assembly permitting the selective formation of a welding gun or a metallisation gun, characterized in that it comprises in combination a main casing of a material of low density which does not conduct electricity; a removable handle adapted to be fitted to said casing; a motor accommodated in said casing; a wire drive device comprising a detachable, interchangeable drive roller and a pawl having a spring and mounted on the casing to be adjustable in relation to the drive roller; a mechanical connection between the motor and the drive roller; disconnectable means for supplying the welding or metallisation wire through the wire puller assembly; disconnectable means for supplying the necessary power to the motor; a base pierced by at least one channel for the supply of a gas to a head of a type known per se and carried by the base, corresponding to the type of gun which it is desired to form; disconnectable means for connecting said passage to an external source; and means for detachably and adjustably fastening said base on said casing.

2. A wire puller assembly according to claim 1, applied to the formation of a welding gun, wherein the base has in addition means for supplying electric current to a contact nozzle of known type which is incorporated in the welding head carried by the base, and disconnectable means for connecting said current supply means to an external current supply.

3. A wire puller assembly according to claim 1, wherein electric conductors are embedded in the mass of the casing and terminate at one end in means for effecting their connection to a control switch embedded in the handle of the wire puller assembly and provided with an external operating button, and at their other end in means for effecting their connection to a circuit outside the wire puller assembly.

4. A wire puller assembly according to claim 3, applied to the formation of a welding gun, wherein the aforesaid external electric circuit contains a three-way electrically controlled valve connected to a compressed air source, to the motor of the assembly, and to the free atmosphere, the obturator member of said valve being provided with means for connecting the compressed air source to the motor only if the switch 41 in the handle 2 is closed.

5. A wire puller assembly permitting the selective formation of a welding pistol or a metallisation pistol, comprising in combination a main casing having a plane upper face and two plane end faces, and made of a material of low density which is not a conductor of electricity; a removable handle adapted to fit on one face of said casing opposite the aforesaid plane top face; a first blind bore disposed in the longitudinal direction of the casing and leading into one of the aforesaid end plane faces and a second blind bore the axis of which is situated in a plane perpendicular to the axis of the first bore and leading into the aforesaid plane upper face of the casing and intersecting a side wall of the first bore near the closed end of the latter; a motor-reduction gear unit adapted to fit into the open end of the first bore with its shaft coaxial to the latter; a removable, interchangeable wire drive roller projecting from the plane upper face of the casing; a mechanical transmission disposed in the aforesaid bores between the motor shaft and the drive roller; a pivoting pawl provided with a spring and mounted on the plane face of the casing to be adjustable in relation to the drive roller; a roller mounted loosely in said pawl and having its axis parallel to that of the drive roller in a plane transversal to the base and adapted to cooperate with the drive roller in order to grip and drive the wire; a disconnection device for moving the pawl away from the wire; disconnectable means for supplying the welding or metallisation wire to the wire puller assembly; disconnectable means for supplying the necessary power to the motor; a base pierced by at least one channel for the supply of a gas to a head of a type known per se and carried by the base, corresponding to the type of gun which it is desired to form; disconnectable means for connecting said channel to an external source; and means for detachably and adjustably fastening said base on said second plane end face of the casing.

6. A wire puller assembly according to claim 5, applied to the formation of a welding gun, wherein the base is provided in addition with means for supplying electric current to a contact nozzle of known type which is incorporated in the welding head carried by the base, and disconnectable means for connecting said current supply means to an external current source.

7. A wire puller assembly according to claim 5, wherein the pivot of the pawl is mounted on an eccentric which in turn is pivoted on the top plane face of the casing.

8. A wire puller assembly according to claim 5, wherein the pivot of the pawl is mounted on a slide which in turn is adapted to slide transversely in slide guides provided on the top plane face of the casing.

9. A wire puller assembly according to claim 5, wherein the disconnection device for the pawl is constituted by a screw disposed transversely of the casing and screwing into at least one part detachably fastened to the casing and the end of which bears at a suitable point against the pawl.

10. A wire puller assembly according to claim 5, wherein the disconnection device for the pawl is constituted by a cam situated in a plane parallel to the top plane face of the casing and mounted on an axis perpendicular to said face, said axis having an operating means at its free end.

11. A wire puller assembly according to claim 5, wherein the disconnection device for the pawl is constituted by a cam situated in a plane perpendicular to the top plane face of the casing and mounted on an axis parallel to said face, said axis having an operating means at its free end.

12. A wire puller assembly according to claim 5, wherein electric conductors are embedded in the mass of the casing and terminate at one end in means for effecting their connection to a control switch embedded in the handle of the wire puller assembly and provided with an external operating button, and at their other end in means for effecting their connection to a circuit outside the wire puller assembly.

13. A wire puller assembly according to claim 12, applied to the formation of a welding gun, wherein the aforesaid external electric circuit comprises a three-way electrically controlled valve connected to a compressed air source, to the motor of the assembly, and to the atmosphere, the obturator means of said valve being provided with means for connecting the compressed air source to the motor only if the switch in the handle is closed.

14. A wire puller assembly according to claim 5, wherein the means for detachably fastening the head carrier base to the casing of the wire puller assembly comprises elongated slots provided in the base, tapped holes provided in a plane end face of the casing, and screws passing through said slots and said tapped holes.

15. A wire puller assembly according to claim 5, wherein the spring of the pawl is accommodated in a socket secured to a support part mounted detachably in the top plane face of the casing, and that said socket is provided with an internal screw thread for a spring pressure adjusting screw accessible from the outside of the socket.

References Cited

UNITED STATES PATENTS

| | | | |
|---|---|---|---|
| 1,979,179 | 10/1934 | Taylor | 239——289 X |
| 2,268,202 | 12/1941 | Britton | 239—84 |
| 2,294,816 | 9/1942 | Trabbic | 239—289 X |
| 2,483,545 | 10/1949 | Johnson | 239—289 X |
| 2,539,487 | 1/1951 | Shepard | 239—84 |
| 3,148,818 | 9/1964 | Charlop | 239—84 X |
| 3,190,559 | 6/1965 | Charlop | 239—84 |
| 3,378,203 | 4/1968 | Stanton | 239—84 |

FOREIGN PATENTS 695,490   10/1964   Canada.

M. HENSON WOOD, Jr., *Primary Examiner.*

J. P. MULLINS, *Assistant Examiner.*